(12) United States Patent
Schnippering (10) Patent No.: US 10,956,804 B2
(45) Date of Patent: Mar. 23, 2021

(54) WEARABLE DEVICE, SYSTEM INCLUDING ONE OR MORE RFID TAGS AND A WEARABLE DEVICE, AND WRISTBAND

(71) Applicant: Linxens Holding, Mantes-la-Jolie (FR)

(72) Inventor: Marc Schnippering, East Providence, RI (US)

(73) Assignee: LINXENS HOLDING, Mantes-la-Jolie (FR)

( * ) Notice: Subject to any disclaimer, the term of this patent is extended or adjusted under 35 U.S.C. 154(b) by 51 days.

(21) Appl. No.: 16/022,346

(22) Filed: Jun. 28, 2018

(65) Prior Publication Data

US 2020/0005113 A1    Jan. 2, 2020

(51) Int. Cl.
*G06K 19/077* (2006.01)
(52) U.S. Cl.
CPC . *G06K 19/07762* (2013.01); *G06K 19/07777* (2013.01)

(58) Field of Classification Search
USPC ......................................................... 235/492
See application file for complete search history.

(56) References Cited

U.S. PATENT DOCUMENTS 4,754,285 A * 6/1988 Robitaille ................ H01Q 1/44
343/718
8,474,726 B2 7/2013 Finn 2010/0321161 A1* 12/2010 Isabell ..................... D06H 1/00
340/10.1
2012/0016793 A1 1/2012 Peters et al.
2016/0110639 A1 4/2016 Finn et al.

FOREIGN PATENT DOCUMENTS

WO    2017029324 A1    2/2017

OTHER PUBLICATIONS

Notification of Transmittal of The International Search Report and the Written Opinion of The International Searching Authority, or the Declaration; International Search Report; and Written Opinion of the International Searching Authority for corresponding International Application No. PCT/IB2019/000222, dated Jul. 23, 2019, 13 pages.
Notification of Transmittal of International Preliminary Report on Patentability; International Preliminary Report on Patentability for International Patent Application No. PCT/IB2019/000222, dated Dec. 15, 2019, 20 pages.

* cited by examiner

*Primary Examiner* — Rafferty D Kelly
(74) *Attorney, Agent, or Firm* — Ditthavong, Steiner & Mlotkowski (57) ABSTRACT

A wearable device includes a first holder configured for removably receiving a first transponder and a radio frequency coupling unit. The radio frequency coupling unit includes a coupling portion and an antenna portion connected to the coupling portion. The coupling portion is configured for contactless coupling of the radio frequency coupling unit to the first transponder received by the first holder.

16 Claims, 7 Drawing Sheets

WEARABLE DEVICE, SYSTEM INCLUDING ONE OR MORE RFID TAGS AND A WEARABLE DEVICE, AND WRISTBAND

BACKGROUND

1. Field of the Disclosure

The present disclosure generally relates to wearable devices and systems including wearable devices, in particular, wearable devices that may be used for contactless identification.

2. Description of the Related Art

Wearable devices, such as, for example, wristbands including RFID (Radio Frequency Identification) tags may be used in a variety of applications, such as, for example, transport, access, payment, hospitality and leisure. In radio frequency identification, RFID tags, which are transponders, are provided. The RFID tags may receive radio waves from an RFID reader and may send a response to the RFID reader. For this purpose, each RFID tag may include an electronic circuit, which is typically provided in the form of one or more integrated circuits and an antenna. In some applications of RFID, passive RFID tags may be used. Passive RFID tags do not include a battery, and the electronic circuits of the RFID tag are operated using the energy of radio waves transmitted by the RFID reader. Alternatively, active RFID tags including a battery may be used, wherein the electronic circuits of the RFID tag are operated by means of energy from the battery.

RFID tags may be used in a number of applications, which include payment using a bank account, or access, such as, for example, access to hotel rooms, offices or transportation systems. For example, RFID tags may be used for controlling access to ski lifts in a ski-resort, wherein ski-passes including RFID tags are used.

US 2012/0016793 A1 discloses contactless payment devices that are incorporated into wearable accessories and accouterments. In particular, a wristband payment device is described that includes a cavity in a face portion for holding a payment tag and a slit, slot or opening which allows insertion of the payment tag into the cavity and removal of the payment tag from the cavity. The payment tag has an oval shape and includes an RF-chip circuit which includes a microprocessor chip and a radio frequency antenna.

A problem of the contactless payment devices described in US 2012/0016793 A1 is that the performance of the wristband payment tag is limited by the available size of the payment tag, which includes the radio frequency antenna of the RF-chip circuit. While a small payment tag may improve the comfort of wearing of the wristband payment device, a small payment tag may only include a small antenna, which limits the performance of receiving and transmitting of radio waves by the RF-chip circuit.

U.S. Pat. No. 8,474,726 B2 discloses transponders in the form of secure documents which may be smart cards or national ID cards, and which include a chip module, an antenna mode and a booster antenna. The booster antenna may increase the effective operative distance between the transponder and an external reader with capacitive and inductive coupling. The booster antenna transfers the energy to the antenna module of the transponder by concentrating the magnetic field at the position where the antenna module is located.

A problem of the antenna arrangement disclosed in U.S. Pat. No. 8,474,726 B2 is that the antenna arrangement is configured for inclusion in a card body, which may measure approximately 80 mm×50 mm, which is too large for typical applications in wearable devices.

WO 2017/029324 A1 discloses a transponder apparatus for a transponder unit which may be worn on a human or animal body, such as a collar, band or the like. The transponder apparatus includes an ultra-high frequency (UHF) transponder and a high frequency (HF) transponder. The UHF transponder includes a UHF antenna and a UHF chip, and the HF transponder includes an HF antenna and an HF chip. The HF transponder may be used for communication in a near field range of a few centimetres up to 0.5 m, and the UHF transponder may be used for communication with a transmitter-receiver system in a remote range of 3 to 6 meters.

A problem of the transponder apparatuses of WO 2017/029324 A1 is that each transponder apparatus is typically configured for a particular application so that the use of the wearable transponder unit for a number of different applications is limited.

The present disclosure provides a wearable device, a system including one or more RFID tags and a wearable device, and a wristband which overcome or at least reduce some or all of the above-mentioned problems of the prior art.

SUMMARY OF THE DISCLOSURE

The following presents a simplified summary of the disclosure in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

An illustrative wearable device disclosed herein includes a radio frequency coupling unit and a first holder that is configured for removably receiving a first transponder. The radio frequency coupling unit includes a coupling portion and an antenna portion connected to the coupling portion. The coupling portion is configured for contactless coupling of the radio frequency coupling unit to the first transponder received by the first holder.

An illustrative system disclosed herein includes one or more RFID tags, each RFID tag including a first coupling portion, and a wearable device. The wearable device includes a holder for removably receiving one of the one or more RFID tags and a radio frequency coupling unit. The radio frequency coupling unit includes a second coupling portion inductively coupled to the first coupling portion of the one of the one or more RFID tags received by the holder and an antenna portion connected to the coupling portion. The antenna portion is configured for coupling with an RFID reader.

An illustrative wristband disclosed herein includes a pocket for removably receiving an RFID tag and a slot for inserting the RFID tag into the pocket. The slot is approximately tangential to a circumference of the wristband. A direction of insertion of the RFID tag is approximately parallel to an axial direction of the wristband. The slot is arranged at a side of the wristband that is approximately perpendicular to the axial direction of the wristband.

BRIEF DESCRIPTION OF THE DRAWINGS

The disclosure may be understood by reference to the following description taken in conjunction with the accompanying drawings, in which like reference numerals identify like elements, and in which.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present disclosure will now be described with reference to the attached figures. Various structures, systems and devices are schematically depicted in the drawings for purposes of explanation only and so as to not obscure the present disclosure with details which are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary or customary meaning as understood by those skilled in the art, is intended to be implied by consistent usage of the term or phrase herein. To the extent that a term or phrase is intended to have a special meaning, i.e., a meaning other than that understood by skilled artisans, such a special definition shall be expressively set forth in the specification in a definitional manner that directly and unequivocally provides the special definition for the term or phrase.

A wearable device may include a radio frequency coupling unit and a first holder that is configured for removably receiving a first transponder. The radio frequency coupling unit includes a coupling portion and an antenna portion connected to the coupling portion. The coupling portion is configured for contactless coupling of the radio frequency coupling unit to the first transponder received by the first holder.

The antenna portion may receive radio waves from a reader communicating with the first transponder received by the first holder, and may be used for the transmission of radio waves from the first transponder. The coupling of the antenna portion of the radio frequency coupling unit to the first transponder is contactlessly performed by the coupling portion of the radio frequency coupling unit. Thus, the antenna portion that is used for receiving radio waves from the reader and for transmitting radio waves to the reader is provided in the wearable device, and need not be provided in the first transponder itself. The first transponder may have a relatively small size and the antenna portion of the radio frequency coupling unit that is arranged in the wearable device may have a greater size. Thus, the performance of the receiving and transmission of radio waves by the first transponder may be improved compared to a transponder that communicates only by means of an antenna provided in the transponder itself. Furthermore, since the first transponder is removably received by the first holder, the first transponder may be replaced by another transponder, so that the wearable device and the radio frequency coupling unit thereof may be used with different transponders.

In embodiments, the first holder may be configured for removably receiving a radio frequency identification (RFID) tag, wherein the RFID tag includes the first transponder. Thus, the wearable device may be used with RFID tags.

In embodiments, the coupling portion may be configured for an inductive coupling of the radio frequency coupling unit to the first transponder. Thus, an efficient contactless coupling between the radio frequency coupling unit of the wearable device and the first transponder may be provided.

In embodiments, the first holder may be configured for receiving the first transponder having a card shape with a maximum edge length being at least one of 30 mm or less and 20 mm or less. Thus, small form factor transponders, for example, small form factor RFID tags may be flexibly used with the wearable device.

In embodiments, the first holder may include a pocket configured for inserting the first transponder into the pocket. Additionally, the wearable device may include a slot for inserting the first transponder into the pocket and for removing the first transponder from the pocket. Thus, the first transponder may be protected from adverse influences of the environment of the wearable device, while it may be flexibly be replaced with another transponder if necessary. In embodiments, the wearable device may be one of a wristband and a keyfob. Thus, the wearable device may be conveniently carried by a user.

In embodiments, the wearable device may be a wristband and an extension of the antenna portion in a circumferential direction of the wristband may be greater than an extension of the antenna portion in an axial direction of the wristband. Thus, an antenna portion adapted for efficiently receiving and transmitting radio waves may be provided, wherein the antenna portion is arranged in a manner that allows a convenient wearing of the wristband by a user.

In embodiments, the extension of the antenna portion in the circumferential direction of the wristband may be greater than at least one of an extension of the first holder in the circumferential direction of the wristband, two times the extension of the first holder in the circumferential direction of the wristband and five times the extension of the first holder in the circumferential direction of the wristband. For radio frequencies employed by transponders used in wearable devices, a greater size of the antenna used for receiving and transmitting electromagnetic radiation may improve the efficiency of the receiving and transmission of radio waves. Therefore, the efficiency of receiving and transmitting radio waves by the antenna portion of the radio frequency coupling unit may be further improved compared to wearable devices wherein no radio frequency coupling unit is provided and wherein an internal antenna of a small size transponder is used.

In embodiments, at least the antenna portion of the radio frequency coupling unit may be flexible. Thus, the wearable device may be conveniently worn by a user and damages of the antenna portion may be substantially avoided or at least reduced.

In embodiments, the wearable device may be configured for galvanically isolating the first transponder received by the first holder from the radio frequency coupling unit. Thus, electrical shorts and/or an oxidation of contact portions which, for example, might be caused by water entering the first holder of the wearable device, may be avoided.

In embodiments, the radio frequency coupling unit may be a passive component. Thus, the wearable device need not include a power source, such as, for example, a battery for powering the radio frequency coupling unit. This can reduce weight and improve the reliability of the wearable device.

In embodiments, the radio frequency coupling unit may include an induction coil and the antenna portion of the radio frequency coupling unit may include an antenna coil. Each of the induction coil and the antenna coil may have a spiral shape. Thus, an efficient coupling between the coupling portion of the radio frequency coupling unit and the first transponder and an efficient receiving and transmission of radio waves by the antenna portion of the radio frequency coupling unit may be obtained.

In embodiments, an inner end of the antenna coil may be connected to an outer end of the induction coil and an outer end of the antenna coil may be connected to an inner end of the induction coil.

In embodiments, the induction coil and the antenna coil may be formed by one non-interrupted wire. Thus, a manufacturing of the radio frequency coupling unit may be simplified. Additionally, a robustness of the radio frequency coupling unit may be increased since a number of connection portions such as solder joints, which might break more easily than a non-interrupted wire, may be reduced.

In embodiments, the radio frequency coupling unit may be an active component. The wearable device may include a battery for powering the radio frequency coupling unit. Thus, a power of the radio waves that may be transmitted by the wearable device may be increased, which may allow an increase of the range of the transmission of data to and from the first transponder received by the first holder of the wearable device.

In embodiments, the wearable device may further include a second holder for removably receiving a second transponder. Thus, the wearable device may be used with two different transponders, so that the wearable device may be used for a greater number of different applications.

In embodiments, the wearable device may further include a rotation mechanism. The rotation mechanism is rotatable between a first position and a second position. In the first position of the rotation mechanism, the first holder is arranged so that the first transponder received by the first holder is contactlessly coupled to the coupling portion of the radio frequency coupling unit. In the second position of the rotation mechanism, the second transponder received by the second holder is contactlessly coupled to the coupling portion of the radio frequency coupling unit. Thus, by operating the rotation mechanism, a user of the wearable device may alternatively activate/deactivate the first transponder received by the first holder or the second transponder received by the second holder.

A system may include one or more RFID tags, each RFID tag including a first coupling portion, and a wearable device. The wearable device includes a holder for removably receiving one of the one or more RFID tags and a radio frequency coupling unit. The radio frequency coupling unit includes a second coupling portion inductively coupled to the first coupling portion of the one of the one or more RFID tags received by the holder and an antenna portion connected to the coupling portion. The antenna portion is configured for coupling with an RFID reader.

The radio frequency coupling unit of the wearable device may improve a connection between the one of the one or more RFID tags received by the holder of the wearable device and the RFID reader, since the antenna portion of the radio frequency coupling unit may improve a strength of a signal from the RFID reader received by the wearable device and may improve an intensity of a signal that is sent by the one of the one or more RFID tags. Furthermore, since the holder of the wearable device may removably receive one of the one or more RFID tags, the wearable device may alternatively be used with more than one RFID tag, so that it is not necessary to provide an individual antenna portion for each RFID tag.

In embodiments, at least one of the one or more RFID tags is configured for contactless authentication.

In embodiments, each of the one or more RFID tags has a card shape with a maximum edge length of at least one of about 30 mm or less and about 20 mm or less. Thus, a relatively small size of the one or more RFID tags may be provided.

In embodiments, each of the first coupling portion and the second coupling portion includes an induction coil. Thus, an efficient coupling between the one or more RFID tags and the radio frequency coupling unit of the wearable device may be provided.

A wristband may include a pocket for removably receiving an RFID tag and a slot for inserting the RFID tag into the pocket. The slot is approximately tangential to a circumference of the wristband. A direction of insertion of the RFID tag is approximately parallel to an axial direction of the wristband. The slot is arranged at a side of the wristband that is approximately perpendicular to the axial direction of the wristband.

Thus, the RFID tag may conveniently be inserted into the pocket of the wristband while the wristband is worn by a user.

Figure 1:
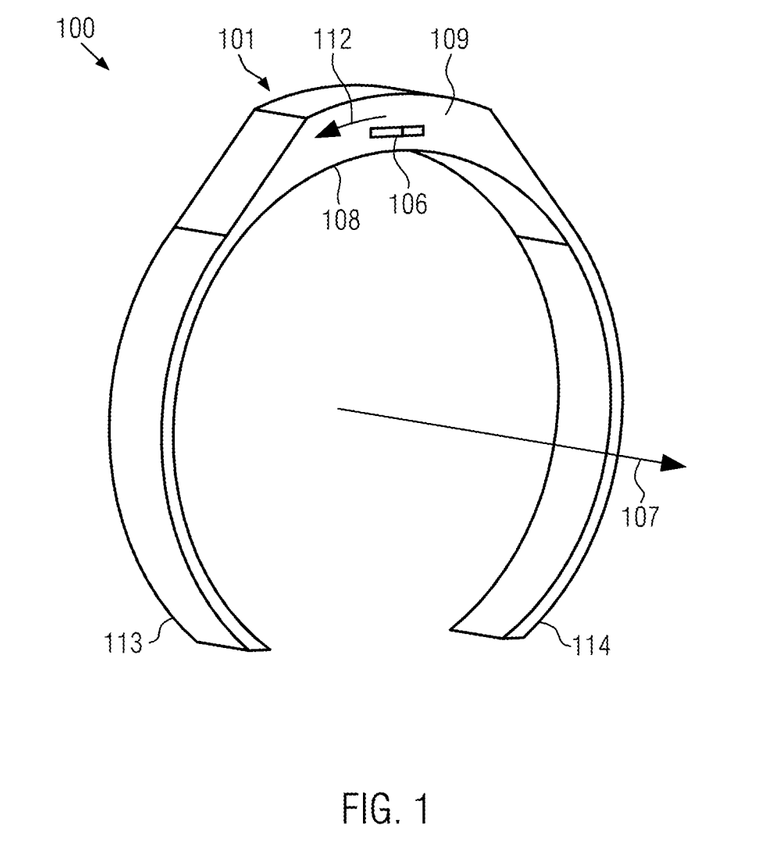
FIG. 1 shows a schematic view of a wearable device according to an embodiment.

FIG. 1 shows a schematic side view of a wearable device 100, which is a wristband that may be worn around the arm of a user. Other views of the wearable device 100 are shown in FIGS. 2a, 2b, 2c and 3. Arrows denote an axial direction 107 and a circumferential direction 112 of the wristband 100. When the wristband 100 is worn by a user, the arm of the user extends through the wristband 100 along the axial direction 107, and the circumferential direction 112 extends around the wrist of the user. The wristband 100 may be formed from a material that has an elasticity, for example, a plastic material, so that the user may force portions 113, 114 of the wristband apart, and insert his/her arm between the portions 113, 114 of the wristband. In other embodiments, the wristband 100 may be provided with a clasp (not shown) for fixing the wristband to the wrist of the user.

The wristband 100 includes a holder 101 for removably receiving a transponder 111. The insertion of the transponder 111 into the holder 101 and the arrangement of the transponder 111 in the holder 101 is illustrated in FIGS. 2a, 2b, 2c and 3. The holder 101 includes a slot 106 through which the transponder 111 may be inserted into the wristband 100 and removed from the wristband 100, and a pocket 105 (see FIGS. 2a, 2b, 2c and 3) provided in the wristband 100 for removably receiving the transponder 111. In embodiments, the pocket 105 can be provided in form of a cavity. The slot 106 may extend along the circumferential direction 112 of the wristband 100, and it may be tangential to an inner circumference 108 of the wristband 100. When the wristband 100 is worn by a user, the inner circumference 108 of the wristband 100 rests on the wrist of the user.

The slot 106 may be arranged at a side 109 of the wristband 100 that is perpendicular to the axial direction 107 of the wristband 100. When the wristband 100 is worn by a user, the side 109 of the wristband 100 is exposed adjacent to the wrist of the user, so that the slot 109 is accessible while the wristband 100 is worn by the user. Therefore, the transponder 111 may be inserted into the slot 106 of the wristband 100 and may be removed from the slot 106 of the wristband 100 while the wristband 100 is worn.

Figure 2A:
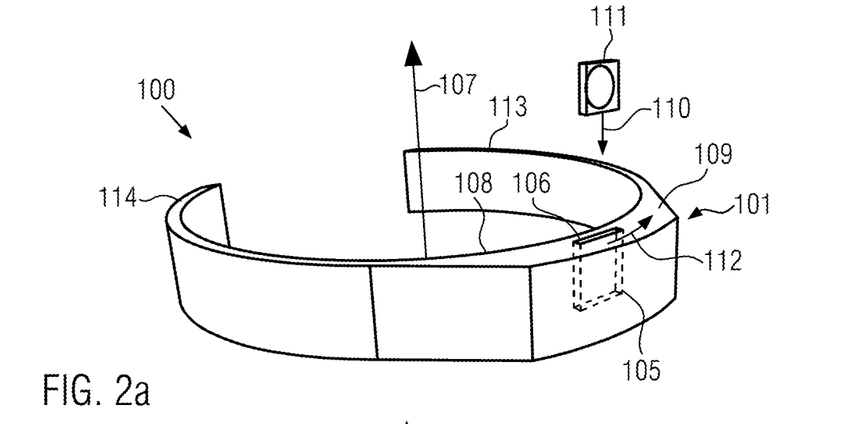
FIGS. 2a, 2b and 2c show schematic views of the wearable device of FIG. 1 and a transponder illustrating the insertion of the transponder into the wearable device.
Figure 2B:
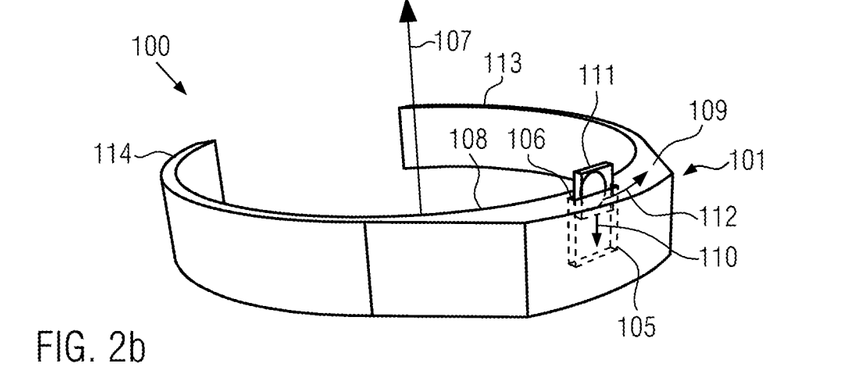
Figure 2C:
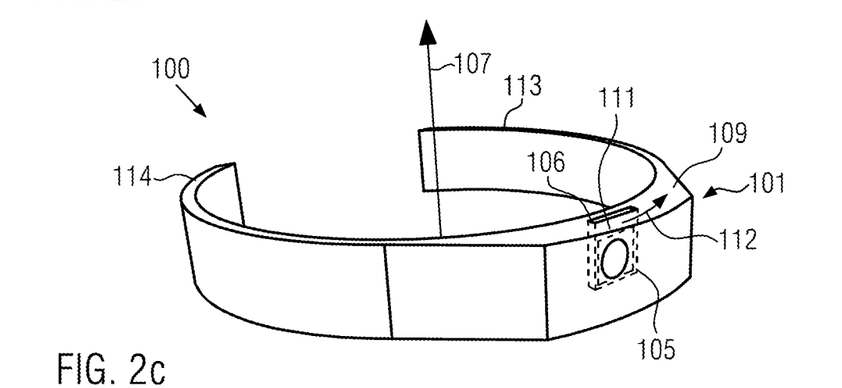

FIGS. 2a, 2b and 2c schematically illustrate the insertion of the transponder 111 into the holder 101 of the wristband 100. As shown in FIG. 2a, the transponder 111 may be moved towards the slot 106 of the holder 101 along a direction of insertion 110 that is approximately parallel to the axial direction 107 of the wristband 100. FIG. 2b shows the wristband 100 and the transponder 111 in a state during the insertion of the transponder 111 into the wristband 100 wherein the transponder 111 is partially inserted into the holder 101 through the slot 106. FIG. 2c shows a configuration wherein the transponder 111 is received by the holder 101. As can be seen from FIGS. 2b and 2c, when the transponder 111 is received by the holder 101, the transponder 111 is arranged within the pocket 105 provided in the wristband 100. For removing the transponder 111 from the holder 101, the transponder 111 may be pulled out of the pocket 105 through the slot 106. In some embodiments, the wristband 100 may be provided with a retainer for maintaining the transponder 111 in the pocket 105 of the holder 101, for example, an elastic protrusion (not shown) at one of the side walls of the pocket 105, which may lock into an indentation of the transponder 111.

Figure 3:
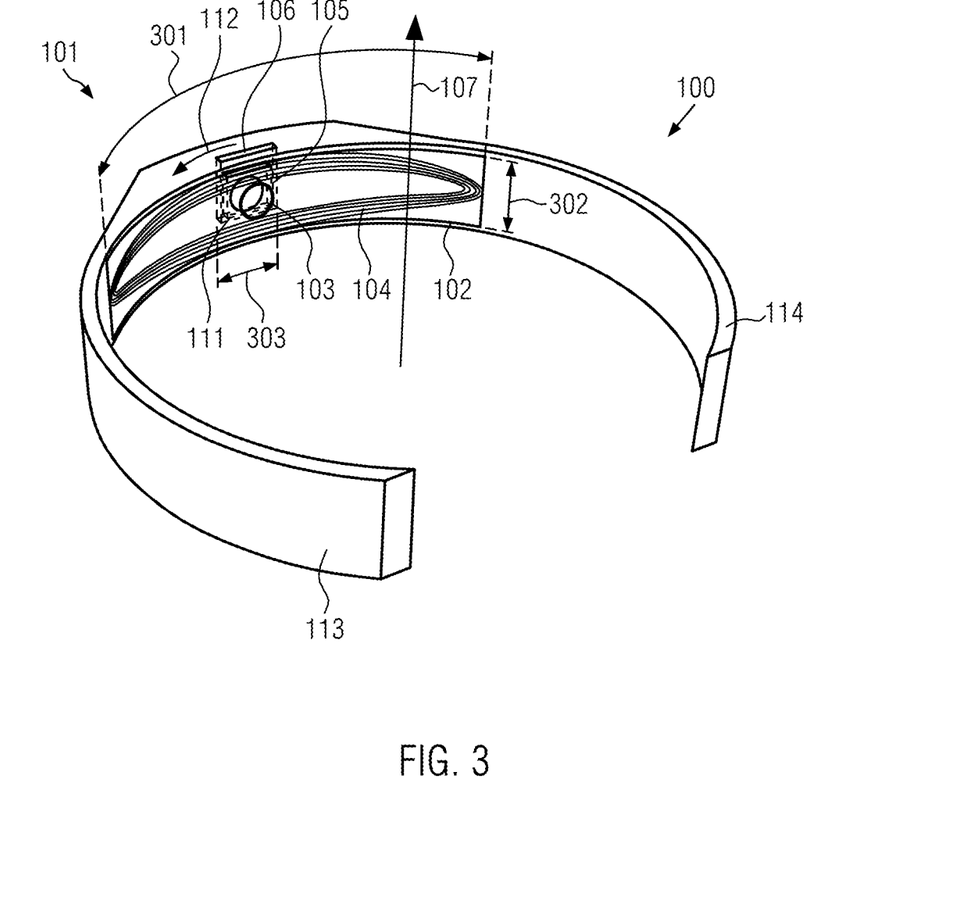
FIG. 3 shows a schematic view of a the wearable device of FIGS. 1, 2a, 2b and 2c and a transponder, illustrating the arrangement of a radio frequency coupling unit in the wearable device.

In embodiments, the wristband 100 may additionally include a radio frequency coupling unit 102, which is shown, in particular, in FIG. 3. The radio frequency coupling unit 102 may be provided within the body of the wristband 100, so that, in embodiments wherein the wristband 100 is formed from a non-transparent material, the radio frequency coupling unit 102 cannot be seen by the user, as shown in FIG. 1. FIG. 3 shows an "X-ray" view of the wristband 100, wherein elements of the wristband within the body of the wristband are shown.

The radio frequency coupling unit 102 includes a coupling portion 103 and an antenna portion 104 that is connected to the coupling portion 103. The coupling portion 103 is configured for contactless coupling of the radio frequency coupling unit 102 to the transponder 111 when the transponder 111 is received by the holder 101.

Figure 4:
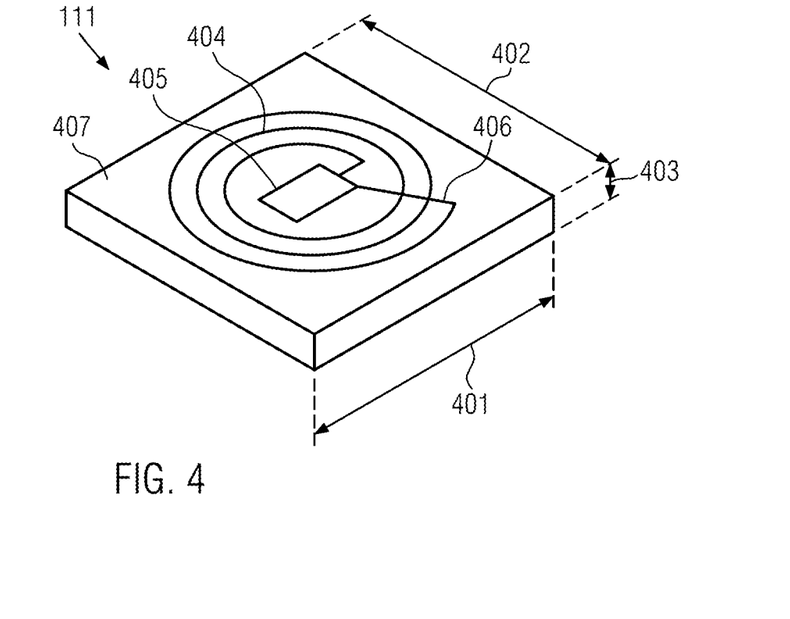
FIG. 4 shows a schematic view of a transponder that may be used in a wearable device according to an embodiment.

FIG. 4 shows a schematic view of the transponder 111 according to an embodiment. The transponder 111 may be a radio frequency identification (RFID) tag, which may be adapted for communication with an RFID reader (not shown) using the radio frequency coupling unit 102. In some embodiments, the RFID tag can be used for contactless authentication, for example for performing payment transactions, or for controlling access to an area or a building.

The transponder 111 may include circuitry 405, which, in embodiments, may be provided in the form of an integrated circuit and a coupling portion 404 for coupling with the coupling portion 103 of the radio frequency coupling unit 102. Features of the circuitry 405 may correspond to features of known circuitry used in RFID tags. The coupling portion 404 may be an induction coil for inductive coupling to the coupling portion 103 of the radio frequency coupling unit 102. The coupling portion 404 may be provided in the form of an electrically conductive wire, in particular, a wire formed from an electrically conductive metal such as copper having a spiral configuration. In FIG. 4, three windings of the induction coil of the coupling portion 104 are shown. In other embodiments, the induction coil of the coupling portions 104 can have a different number of windings.

The inner end of the spiral-shaped coupling portion 404 may be connected to the circuitry 405 and the outer end of the spiral-shaped coupling portion 404 may be connected to the circuitry 405 by means of a bridge portion 406 that is electrically insulated from the spiral-shaped induction coil of the coupling portion 404.

The circuitry 405 and the coupling portion 404 may be embedded into a carrier 407. The carrier 407 may be formed of an electrically insulating material, for example, plastic and it may have a card shape. In embodiments, the carrier 407 may have a generally cuboid shape. In FIG. 4, edge lengths of the cuboid-shaped carrier 407 of the transponder 101 are denoted by reference numerals 401, 402, 403 wherein the edge length 403, being a thickness of the transponder 111, may be substantially smaller than the edge lengths 401, 402, in accordance with the card shape of the transponder 111. Edge length 401, being a longer one of the edge lengths 401, 402 of the transponder 111 is the maximum edge length of the transponder 111. In embodiments, the maximum edge length 401 may be 30 mm or less and/or 20 mm or less. In some embodiments, the dimensions of the transponder 111 may substantially correspond to the dimensions of a mini-SIM card (2FF) having an edge length 401 of approximately 25 mm, an edge length 402 of approximately 15 mm and a thickness 403 of approximately 0.76 mm. In other embodiments, the dimensions of the transponder 111 may correspond to the dimensions of a micro-SIM card (3FF), wherein the edge length 401 is approximately 15 mm, the edge length 402 is approximately 12 mm and the thickness 403 is approximately 0.76 mm.

The dimensions of the pocket 105 of the holder 101 of the wristband 100 may be slightly greater than the dimensions of the transponder 111 so that the transponder 111 may be inserted into the pocket 105.

When the transponder 111 is inserted into the holder 101 of the wristband 100, the edge of the transponder 101 having the maximum edge length 401 may be arranged substantially in the axial direction 107 of the wristband 100 and the edge having the edge length 402 may be arranged substantially in the circumferential direction 112.

Referring to FIG. 3 again, reference numeral 301 denotes an extension of the antenna portion 104 of the radio frequency coupling unit 102 in the circumferential direction 112 of the wristband 100, reference numeral 302 denotes an extension of the antenna portion 104 in the axial direction 107 of the wristband 100 and reference numeral 303 denotes an extension of the holder 101 in the circumferential direction 112 of the wristband 100.

The extension 301 of the antenna portion 104 in the circumferential direction 112 of the wristband 100 may be greater than the extension 302 of the antenna portion 104 in the axial direction 107 of the wristband 100. In some embodiments, the antenna portion 104 may have an elliptical shape. The antenna portion 104 may be curved in the circumferential direction 112 of the wristband 100 so as to match the shape of the wristband 100. The major axis of the elliptical shape of the antenna portion 104 may extend in the circumferential direction 112 of the wristband 100 and the minor axis of the elliptical shape of the antenna portion 104 may extend in the axial direction 107 of the wristband 100.

The extension 303 of the holder 101 in the circumferential direction 112 of the wristband 100 may be slightly greater than the edge length of one of the sides of the transponder 111 that is arranged in the circumferential direction 112 of the wristband 100 when the transponder 111 is inserted into the holder 101, for example, slightly greater than the edge length 402.

The extension 301 of the antenna portion 104 in the circumferential direction 112 of the wristband 100 may be greater than the extension 303 of the holder 101 in the circumferential direction 112 of the wristband 100. Thus, the extension 301 of the antenna portion 104 in the circumferential direction 112 is greater than the extension of the transponder 111 in the circumferential direction 112. Accordingly, a transponder 111 of a relatively small size may be used, whereas the antenna portion 104 may have a greater size for improving the coupling between the transponder 111 and an RFID reader communicating with the transponder 111 compared to a transponder that communicates with the RFID reader without using the radio frequency coupling unit 102. In some embodiments, the extension 301 of the antenna portion 104 in the circumferential direction 112 of the wristband 100 may be greater than two times and/or five times the extension 303 of the holder 101 in the circumferential direction 112 of the wristband 100.

The antenna portion 104 may be flexible. For example, the antenna portion 104 may be formed of a wire of a flexible metal such as, for example, copper. Thus, a breaking of the antenna portion may be avoided and the wristband 100 may be conveniently be worn by a user since the flexibility of the antenna portion 104 may allow an adaptation of the wristband 100 including the antenna portion 104 to the shape of the wrist of the user.

The wristband 100 may be configured for galvanically isolating the transponder 111 received by the holder 101 from the radio frequency coupling unit 102. For this purpose, an electrically insulating material, for example, a plastic, may be provided between the pocket 105 into which the transponder 111 is inserted and the radio frequency coupling unit 102. In some embodiments, the radio frequency coupling unit 102 may be embedded into an electrically insulating material, such as plastic, for providing the galvanic isolation from the transponder 111 received by the holder 101. Thus, the radio frequency coupling unit 102 may be protected from environmental influences such as water.

The coupling portion 103 of the radio frequency coupling unit 102 may be configured for inductive coupling of the radio frequency coupling unit 102 to the transponder 111 received by the holder 101. In some embodiments, the coupling portion 103 may include an induction coil. Inductive coupling does not require a galvanic connection between the transponder 111 and the radio frequency coupling unit 102.

Figure 5:
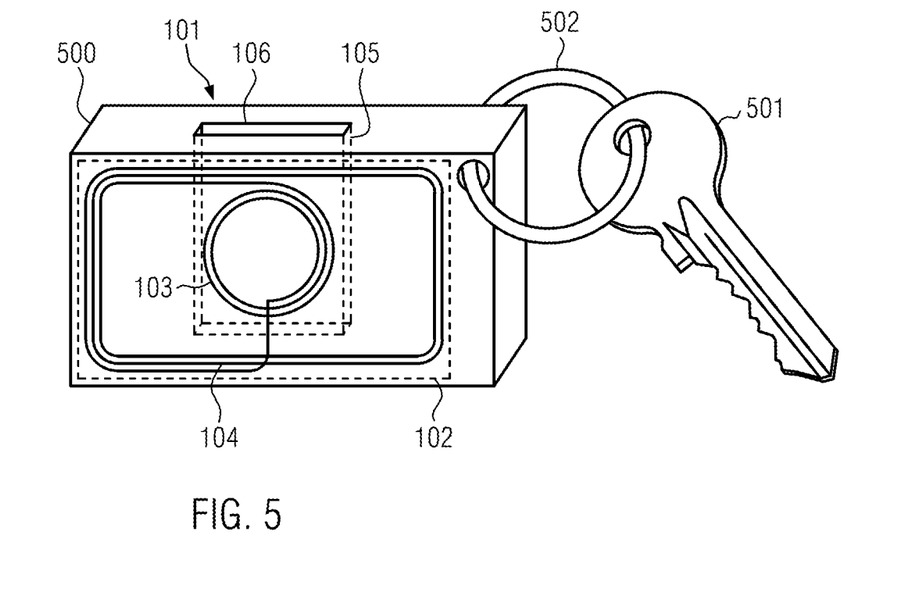
FIG. 5 shows a schematic view of a wearable device according to an embodiment.

The disclosure is not limited to embodiments wherein the wearable device is a wristband 100, as described above with reference to FIGS. 1, 2a, 2b, 2c and 3. In other embodiments, another wearable device may be provided. In some embodiments, the wearable device may be a keyfob 500, as shown in FIG. 5. The keyfob 500 may be connected to a key 501, for example by means of a key-ring 502. Other features of the keyfob 500 may correspond to those of the wristband 100 described above. In particular, the keyfob 500 may include a holder 101 for removably receiving the transponder 111, wherein the holder 101 may include a pocket 105 having a slot 106. Furthermore, the keyfob 500 may include a radio frequency coupling unit 102 including a coupling portion 103 and an antenna portion 104 connected to the coupling portion 103, wherein the coupling portion 103 is configured for contactless coupling of the radio frequency coupling unit 102 to the transponder 111 when the transponder 11 is received by the holder 101. The shape of the antenna portion 104 of the radio frequency coupling unit 102 in the keyfob 500 may be different from the shape of the antenna portion of the radio frequency coupling unit in the wristband 100 described above with reference to FIGS. 1, 2a, 2b, 2c and 3, and may be adapted so as to match the shape of the keyfob 500.

Figure 6:
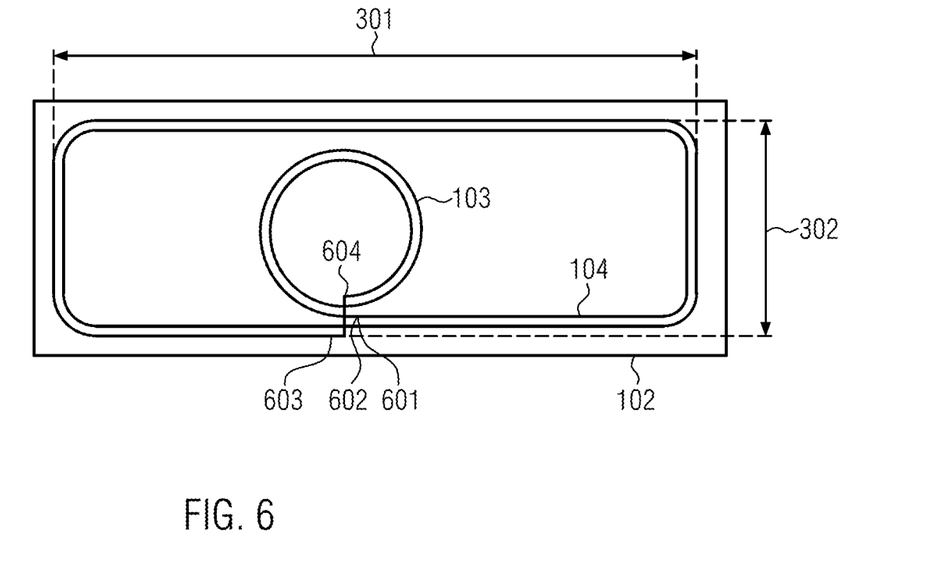
FIG. 6 shows a schematic view of a radio frequency coupling unit that may be used in a wearable device according to an embodiment.

FIG. 6 shows a schematic view of an embodiment of the radio frequency coupling unit 102. In the embodiment of FIG. 6, the radio frequency coupling unit 102 is a passive component that does not include any active circuitry such as, for example, an amplifier.

The radio frequency coupling unit 102 includes an induction coil 103 providing the coupling portion for coupling the radio frequency coupling unit 102 to the transponder 111 and an antenna coil 104 providing the antenna portion of the radio frequency coupling unit 102 that may be used for coupling with an RFID reader. Each of the induction coil 103 and the antenna coil 104 may have a spiral shape, as schematically illustrated in FIG. 6. In FIG. 6, each of the induction coil 103 and the antenna coil 104 is shown to have two windings. In other embodiments, a different number of windings may be used. For example, in some embodiments, each of the induction coil 103 and the antenna coil 104 may have more than two windings. Furthermore, in some embodiments, the number of winding of the antenna coil 104 may be different from the number of windings of the induction coil 103. The induction coil 103 and the antenna coil 104 may be formed from a wire of an electrically conductive metal, such as, for example, copper.

An inner end 601 of the antenna coil 104 may be connected to an outer end 602 of the induction coil 103. An outer end 603 of the antenna coil 104 may be connected to an inner end 604 of the induction coil 103. For connecting the inner end 604 of the induction coil 103 to the outer end 603 of the antenna coil 104, an electrically conductive bridge across the induction coil 103 and the antenna coil 104 may be provided, wherein the bridge is electrically insulated from the induction coil 103 and the antenna coil 104 by an electrically insulating material.

In some embodiments, the induction coil 103 and the antenna coil 104 may be formed by one non-interrupted wire, for example, by a wire of an electrically conductive material such as copper, wherein the wire is formed so that a number of approximately circular loops of successively increasing diameter are provided for forming the spiral-shaped induction coil 103, and a number of approximately elliptical loops of increasing size are provided for forming the spiral-shaped antenna coil 104.

Figure 7:
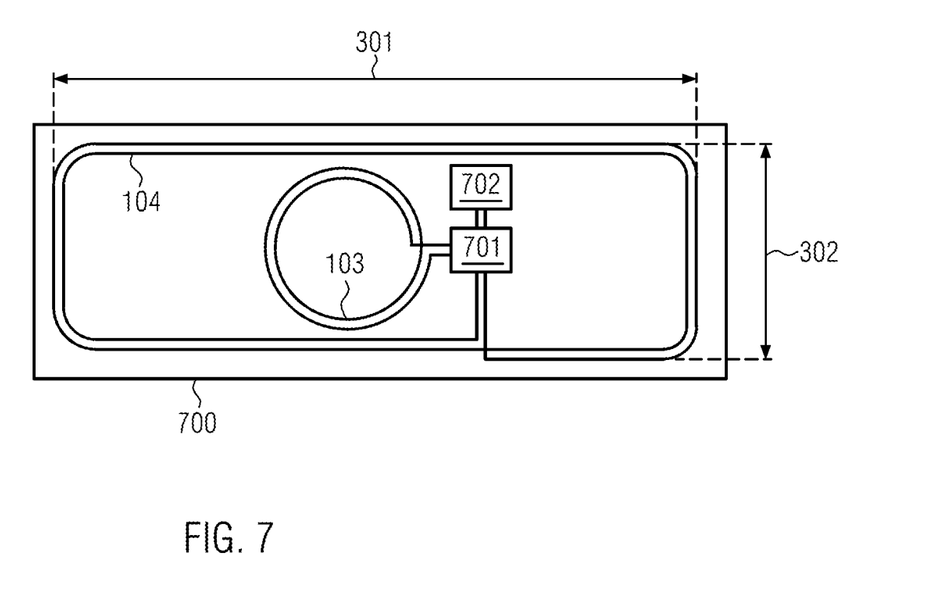
FIG. 7 shows a schematic view of a radio frequency coupling unit that may be used in a wearable device according to an embodiment.

FIG. 7 shows an embodiment of a radio frequency coupling unit 700 that may be used as an alternative to the radio frequency coupling unit 102 described above with reference to FIG. 6. Similar to the radio frequency coupling unit 102, the radio frequency coupling unit can be used for a wearable device being a wristband 100, as described above with reference to FIGS. 1, 2a, 2b, 2c and 3, or for a wearable device being a keyfob 500, as described above with reference to FIG. 5.

Similar to the radio frequency coupling unit 102, the radio frequency coupling unit 700 includes a coupling portion 103 for contactless coupling of the radio frequency coupling unit 102 to the transponder 111 and an antenna portion 104 for coupling to an RFID reader. The coupling portion 103 may be provided as an induction coil and the antenna portion 104 may be provided as an antenna coil.

The radio frequency coupling unit 700 is an active component, which may include an amplifier 701 that is powered by a battery 702. The battery may be a single-use battery or a rechargeable battery. The amplifier 701 may be connected to the coupling portion 103 and the antenna portion 104 and may be configured for amplifying a signal received from the coupling portion 103 before the signal is applied to the antenna portion 104. Additionally, the amplifier 701 may be adapted for amplifying a signal received from the antenna portion 104 before the signal is provided to the coupling portion 103. Thus, a range of the transponder 111 inserted into the holder 101 of the wearable device may be further increased.

Figure 8A:
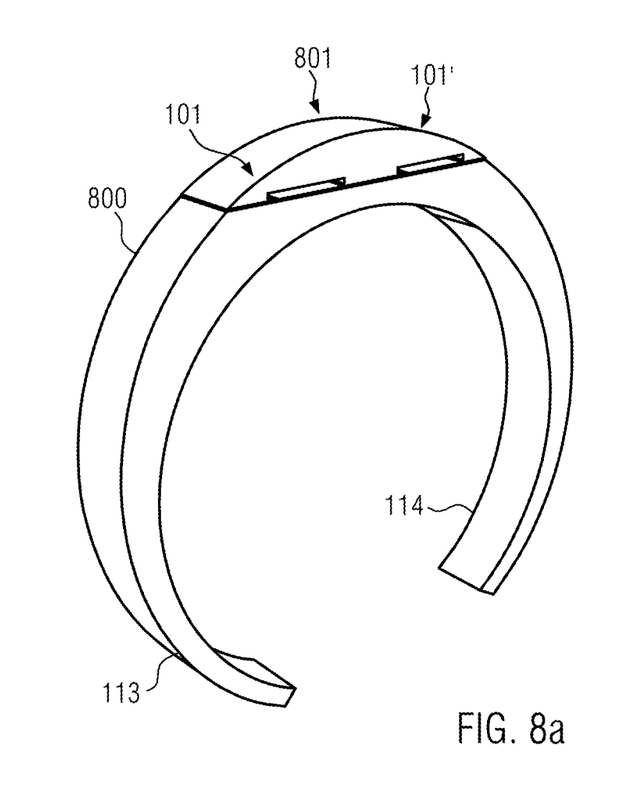
FIGS. 8a and 8b show schematic views of a wearable device according to an embodiment.
Figure 8B:
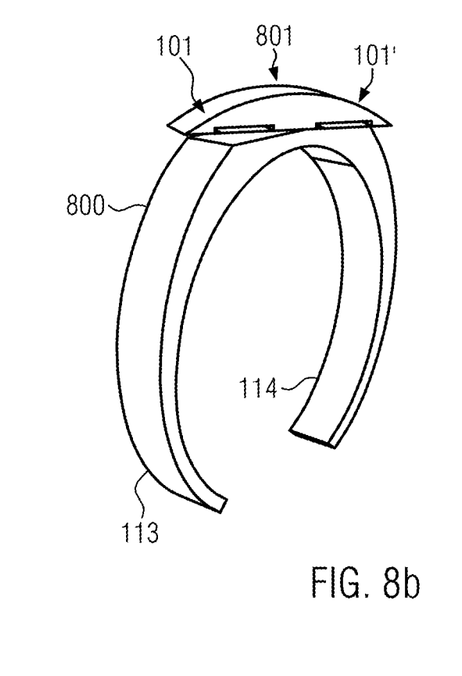

FIGS. 8a and 8b show schematic view of a wearable device 800 according to a further embodiment. The wearable device 800 is a wristband. Similar to the wristband 100 described above with reference to FIGS. 1a, 2a, 2b, 2c and 3, the wristband 800 includes a holder 101 for removably receiving a transponder 111. Additionally, the wristband 800 includes a second holder 101' for receiving a second transponder 111'. Accordingly, in the following, the holder 101 and the transponder 111 will be denoted as "first holder" and "first transponder" respectively. Unless explicitly indicated otherwise, features of the wristband 800 may correspond to features of the wristband 100 described above.

The wristband 800 may include a rotation mechanism 801. FIG. 8b shows a view of the wristband 800 in a configuration wherein the rotation mechanism 801 is rotated rightward compared to the configuration shown in FIG. 8a. The rotation mechanism 801 may allow a rotation by an angle of at least 180 degrees, so that, by rotating the rotation mechanism 801, the transponder 111 inserted into the holder 101' may be arranged at a position corresponding to the position of the transponder 111 in the holder 101 as shown in FIG. 8a and vice versa.

Figure 9A:
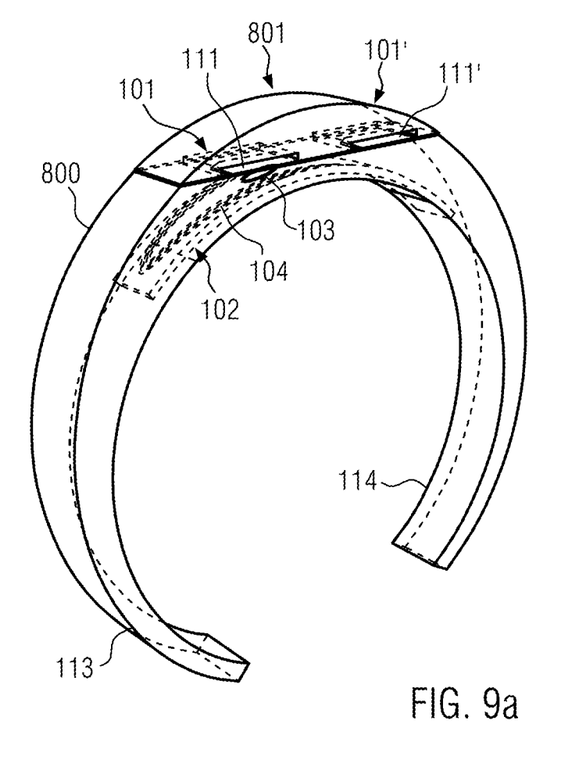
FIGS. 9a and 9b show schematic views of the wearable device of the embodiment of FIGS. 8a and 8b, illustrating the arrangement of a radio frequency coupling unit in the wearable device.
Figure 9B:
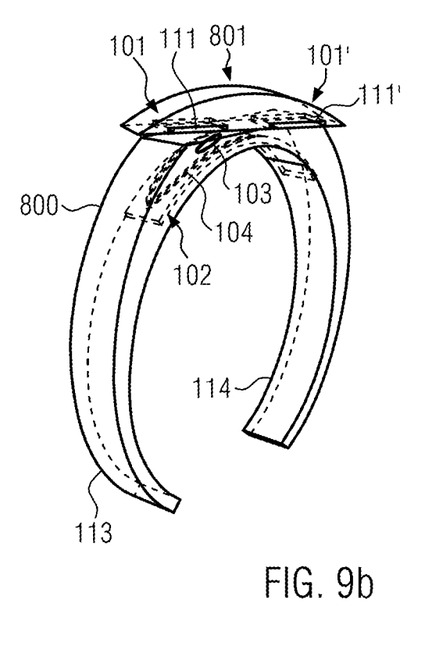

FIGS. 9a and 9b show schematic "X-ray" views of the wristband 800 in the configurations shown in FIGS. 8a and 8b, respectively. As can be seen in FIGS. 9a and 9b, the wristband 800 may include a radio frequency coupling unit 102 that includes a coupling portion 103 and an antenna portion 104. Further features of the radio frequency coupling unit 102 may correspond to those of the radio frequency coupling unit 102 as described above with reference to FIG. 6. As an alternative to the radio frequency coupling unit 102, a radio frequency coupling unit 700 being an active component as described above with reference to FIG. 7 may be used.

The coupling portion 103 of the radio frequency coupling unit 102 may be arranged at a position in the wristband 800 where it is closer to the first holder 101 than to the second holder 101' when the rotation mechanism 801 is in the position shown in FIGS. 8a and 9a. When the rotation mechanism 801 is rotated by 180 degrees, the second holder 101' is closer to the coupling portion 103 of the radio frequency coupling unit 102 than the first holder 101. Thus, by rotating the rotation mechanism 801, either the first transponder 111 in the first holder 101 may be arranged adjacent to the coupling portion 103 or the second transponder 111' in the second holder 101' may be arranged adjacent to the coupling portion 103. Since the coupling between the coupling portions of the transponders 111, 111' and the coupling portion 103 of the radio frequency coupling unit 102 decreases with increasing distance, by rotating the rotation mechanism 801, a coupling between the coupling portion of the first transponder 111 and the coupling portion 103 of the radio frequency coupling unit 102, or a coupling between the coupling portion of the second transponder 111' and the coupling portion 103 of the antenna portion 104 may alternatively be provided. Thus, the first transponder 111 or the second transponder 111' may alternatively be used, without there being a need to remove one of the transponders 111, 111' from the wristband 800 and inserting the other transponder.

In further embodiments, instead of rotation mechanism 801, a sliding mechanism can be provided for alternatively coupling the coupling unit 103 of the radio frequency coupling unit 102 with the respective coupling unit of the first transponder 111 or the second transponder 111'. Thus, one of the transponders 111, 111' can flexibly be selected.

In still further embodiments, more than two holders for receiving a transponder and a selection mechanism for selecting one of the transponders by rotation or sliding can be provided. In embodiments, a system may be provided. The system may include a wearable device, for example a wristband 100 as described above with reference to FIGS. 1, 2a, 2b, 2c and 3, a keyfob 500 as described above with reference to FIG. 5 or a wristband 800 as described above with reference to FIG. 8. Additionally, one or more transponders having features corresponding to those of the transponders 111, 111' described above may be provided. The transponders can interchangeably be inserted into the one or more holders 101, 101' of the wearable device, so that the transponders can alternatively be used with the wearable device.

The present disclosure is not limited to embodiments wherein the wearable device includes a radio frequency coupling unit as described above. In other embodiments, the radio frequency coupling unit can be omitted, and the transponders can communicate with an RFID reader using only an internal transponder antenna.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed:

1. A wristband comprising:
a first holder configured for removably receiving a first transponder, wherein said first holder comprises:
a cavity configured for inserting said first transponder into said cavity; and
a slot for inserting said first transponder into said cavity and for removing said first transponder from said cavity;
wherein said slot is approximately tangential to a circumference of said wristband, and a direction of insertion of said first transponder into said slot is approximately parallel to an axial direction of said wristband, wherein said slot is arranged at a side of said wristband that is approximately perpendicular to said axial direction of said wristband;
said wristband further comprising:
a radio frequency coupling unit comprising a coupling portion and an antenna portion connected to said coupling portion, wherein said coupling portion is configured for contactless inductive coupling of said radio frequency coupling unit to said first transponder received by said first holder,
wherein said coupling portion of said radio frequency coupling unit comprises an induction coil having two or more windings, and wherein said antenna portion of said radio frequency coupling unit comprises an antenna coil.

2. A wristband according to claim 1, wherein said first holder is configured for removably receiving a radio frequency identification (RFID) tag, said RFID tag comprising said first transponder.

3. A wristband according to claim 1, wherein said first holder is configured for receiving said first transponder having a card shape with a maximum edge length being at least one of 30 mm or less and 20 mm or less.

4. A wristband according to claim 1, wherein an extension of said antenna portion in a circumferential direction of said wristband is greater than an extension of said antenna portion in the axial direction of said wristband.

5. A wristband according to claim 4, wherein said extension of said antenna portion in said circumferential direction of said wristband is greater than an at least one of an extension of said first holder in said circumferential direction of said wristband, two times said extension of said first holder in said circumferential direction of said wristband and five times said extension of said first holder in said circumferential direction of said wristband.

6. A wristband according to claim 1, wherein at least said antenna portion of said radio frequency coupling unit is flexible.

7. A wristband according to claim 1, wherein said wristband is configured for galvanically isolating said first transponder received by said first holder from said radio frequency coupling unit.

8. A wristband according to claim 1, wherein said radio frequency coupling unit is a passive component.

9. A wristband according to claim 1, wherein each of said induction coil and said antenna coil has a spiral shape.

10. A wristband according to claim 9, wherein an inner end of said antenna coil is connected to an outer end of said induction coil, and wherein an outer end of said antenna coil is connected to an inner end of said induction coil.

11. A wristband according to claim 10, wherein said induction coil and said antenna coil are formed by one non-interrupted wire.

12. A wristband according to claim 1, wherein said radio frequency coupling unit is an active component.

13. A wristband according to claim 12, further comprising a battery for powering said radio frequency coupling unit.

14. A wristband according to claim 1, further comprising a second holder for removably receiving a second transponder.

15. A wearable device according to claim 14, further comprising:
a first holder for removably receiving a first transponder, wherein said first holder comprises a cavity configured for inserting said first transponder into said cavity; and
a radio frequency coupling unit comprising a coupling portion and an antenna portion connected to said coupling portion, wherein said coupling portion is configured for contactless inductive coupling of said radio frequency coupling unit to said first transponder received by said first holder,
wherein said coupling portion of said radio frequency coupling unit comprises an induction coil having two or more windings, and wherein said antenna portion of said radio frequency coupling unit comprises an antenna coil,
said wearable device further comprising:
a second holder for removably receiving a second transponder; and
a rotation mechanism, said rotation mechanism being rotatable between a first position and a second position wherein, in said first position of said rotation mechanism, said first holder is arranged such that said first transponder received by said first holder is contactlessly coupled to said coupling portion of said radio frequency coupling unit and, in said second position of said rotation mechanism, said second transponder received by said second holder is contactlessly coupled to said coupling portion of said radio frequency coupling unit.

16. A wearable device, comprising:
a first holder configured for removably receiving a first transponder;
a second holder configured for removably receiving a second transponder;
a radio frequency coupling unit comprising a coupling portion and an antenna portion connected to said coupling portion; and
a rotation mechanism, said rotation mechanism being rotatable between a first position and a second position wherein, in said first position of said rotation mechanism, said first holder is arranged such that said first transponder received by said first holder is contactlessly coupled to said coupling portion of said radio frequency coupling unit and, in said second position of said rotation mechanism, said second transponder received by said second holder is contactlessly coupled to said coupling portion of said radio frequency coupling unit.

* * * * *